United States Patent
Perkinson et al.

(10) Patent No.: US 6,981,844 B2
(45) Date of Patent: Jan. 3, 2006

(54) CYCLIC ACTUATION SYSTEM FOR A CONTROLLABLE PITCH PROPELLER AND A METHOD OF PROVIDING AIRCRAFT CONTROL THEREWITH

(75) Inventors: Robert H. Perkinson, Somers, CT (US); Paul A. Carvalho, Westfield, MA (US); David V. Arel, Granby, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 0 days.

(21) Appl. No.: 10/680,922

(22) Filed: Oct. 8, 2003

(65) Prior Publication Data

US 2005/0079053 A1 Apr. 14, 2005

(51) Int. Cl.
*B64C 11/06* (2006.01)

(52) U.S. Cl. .................. 416/1; 416/157 A; 416/157 R; 416/164; 416/168 R (58) Field of Classification Search ................ 416/1, 416/110, 155, 156, 157 R, 157 A, 157 B, 416/158, 162, 164, 168 R
See application file for complete search history.

(56) References Cited

U.S. PATENT DOCUMENTS

| | | | | |
|---|---|---|---|---|
| 3,824,037 A | * | 7/1974 | Mautz et al. | ................ 416/136 |
| 4,163,630 A | * | 8/1979 | Weiland | .................. 416/134 A |
| 4,430,045 A | | 2/1984 | Cresap | |
| 4,573,873 A | | 3/1986 | Yao et al. | |
| 4,591,313 A | * | 5/1986 | Miyatake et al. | ............ 416/155 |
| 4,650,400 A | * | 3/1987 | David | .......................... 416/114 |
| 4,730,795 A | * | 3/1988 | David | .......................... 416/117 |
| 5,199,850 A | * | 4/1993 | Carvalho et al. | ............ 416/162 |
| 5,358,381 A | | 10/1994 | Covington et al. | |
| 5,474,424 A | | 12/1995 | Bietenhader et al. | |
| 5,511,947 A | | 4/1996 | Schmuck | |
| 5,740,987 A | | 4/1998 | Morris et al. | |
| 5,758,844 A | | 6/1998 | Cummings | |
| 5,826,822 A | | 10/1998 | Rehm | |
| 6,077,040 A | * | 6/2000 | Pruden et al. | ........... 416/157 R |
| 6,296,444 B1 | | 10/2001 | Schellhase et al. | |
| 6,789,764 B2 | * | 9/2004 | Bass et al. | ..................... 244/10 |

FOREIGN PATENT DOCUMENTS

| | | | |
|---|---|---|---|
| GB | 924 839 A | | 5/1963 |
| GB | 1 203 979 A | | 9/1970 |
| GB | 2140096 A | * | 11/1984 |
| GB | 2 346 657 A | | 2/1999 |

* cited by examiner

*Primary Examiner*—Edward K. Look
*Assistant Examiner*—Igor Kershteyn
(74) *Attorney, Agent, or Firm*—Carlson, Gaskey & Olds (57) ABSTRACT

A propeller control generates a once per revolution (1P) blade thrust variation through cyclic pitch of rigidly mounted non-flapping propeller blades. The resultant shaft bending moment is used to provide aircraft attitude control. Axial translation of a pitch change assembly including a pitch change yoke along an axis of rotation drives a pitch link attached to each propeller blade to collectively change the propeller blade pitch angle. The pitch change yoke includes a translating pitch change yoke portion and an articulatable pitch change yoke portion. Deflection of the articulatable pitch change yoke portion changes the pitch change effect of each pitch link as a function of its angular position such that a sinusoidal pitch angle is superimposed on normal pitch angle. Cyclic pitch change actuators deflect the articulatable pitch change yoke portion in any angular direction while the linear deflection of the cyclic pitch change actuators generate the magnitude of the cyclic pitch.

27 Claims, 7 Drawing Sheets

CYCLIC ACTUATION SYSTEM FOR A CONTROLLABLE PITCH PROPELLER AND A METHOD OF PROVIDING AIRCRAFT CONTROL THEREWITH

BACKGROUND OF THE INVENTION

The present invention relates to an aircraft control system, and more particularly to an actuation system for propeller blade angle control that provides cyclic pitch of individual propeller blades to generate a bending moment which is transmitted to the airframe to control an aircraft while minimizing external control surfaces.

Design of rotors and propellers is often quite complex. A large number of factors must be taken into account, including flexure of the rotor under heavy loads and the required motions of the rotor blades with respect to the drive mechanism.

Rigid turboprop propeller systems provide collective pitch control of the propeller blades. Pitch angles ranging from a fully feathered minimum drag angle to pitch angles which provide reverse thrust are typically provided to provide propeller speed and power management along a propeller axis of rotation. Inflow angles not along the axis of rotation due to aircraft maneuvers generate bending moments on the propeller shaft and subsequent twisting of the airframe. The resulting bending moments are rather large and conventional propeller systems are rigidly structured therefore.

Fully articulated rotors such as those of helicopters provide cyclic and collective pitch of the rotor blades. Articulation of the rotor disc plane vectors the rotor thrust to provide fore, aft and lateral movement of the helicopter with minimal bending moment of the rotor shaft. As compared to rigid turboprop propeller systems, articulated rotor systems of a helicopter are significantly more complex.

Prop rotors are used as both propellers and rotors in aircraft such as a tilt rotor aircraft. A tilt rotor or tilt wing aircraft typically employs a pair of rotor systems which are pivotable such that the rotors may assume a vertical or horizontal orientation. In a horizontal orientation (i.e., horizontal rotor plane), the aircraft is capable of hovering flight, while in a vertical orientation (i.e., vertical rotor plane), the aircraft is propelled in the same manner as conventional propeller driven fixed-wing aircraft. Typically, tilt rotor aircraft utilize fully articulated rotors to provide effective hover and slow speed control. Tilt rotor aircraft therefore provide a combination of advantages and complexities of both fixed wing turboprop aircraft and helicopter systems.

Accordingly, it is desirable to provide an actuation system to incorporate cyclic pitch features into conventional rigid mounted prop rotor systems without the complexities inherent in fully articulated rotors.

SUMMARY OF THE INVENTION

The propeller control system according to the present invention generates a once per revolution (1P) thrust variation on each propeller blade through cyclic pitch. The present invention advantageously utilizes conventional propeller shaft mounting arrangements to generate aircraft attitude control through generation of a moment about the propeller shaft.

Translation of a pitch change assembly including a pitch change yoke along an axis of rotation drives a pitch link attached to each propeller blade to thereby collectively change the pitch thereof toward the desired blade pitch angle. The pitch change yoke includes a translating pitch change yoke portion and an articulatable pitch change yoke portion. The articulatable pitch change yoke portion is mounted to the translating pitch change yoke portion so that the articulatable pitch change yoke portion can be deflected off the axis of rotation independent of the translating pitch change yoke portion.

An aircraft flight control system commands a cyclic pitch controller to generate desired moment about the propeller axis of rotation to assist aircraft maneuvering or reduce undesired external forces being applied to the airframe and minimize undesired cyclic loads to the propeller. A cyclic pitch actuator operates to deflect the articulatable pitch change yoke portion away from the axis of rotation. Deflection of the articulatable pitch change yoke portion changes the pitch change effect of each pitch link as a function of its angular position. In other words, a sinusoidal pitch angle is selectively superimposed on collective pitch angle.

Cyclic pitch actuators provides a moment in any angular direction while the linear deflection of the cyclic pitch actuators generates the magnitude of propeller thrust. As the present invention generates a moment rather than a force, separation between the propeller and the aircraft center of gravity is not required to affect attitude and aircraft control is maintained during single engine operation. Moreover, because the propeller blades are rigidly mounted and do not flap, propeller to propeller and propeller to aircraft clearances need not increase to incorporate the present invention.

Accordingly, the present invention provides a propeller control system which generates cyclic pitch with rigid mounted prop rotor systems without the complexities inherent in fully articulated rotors.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
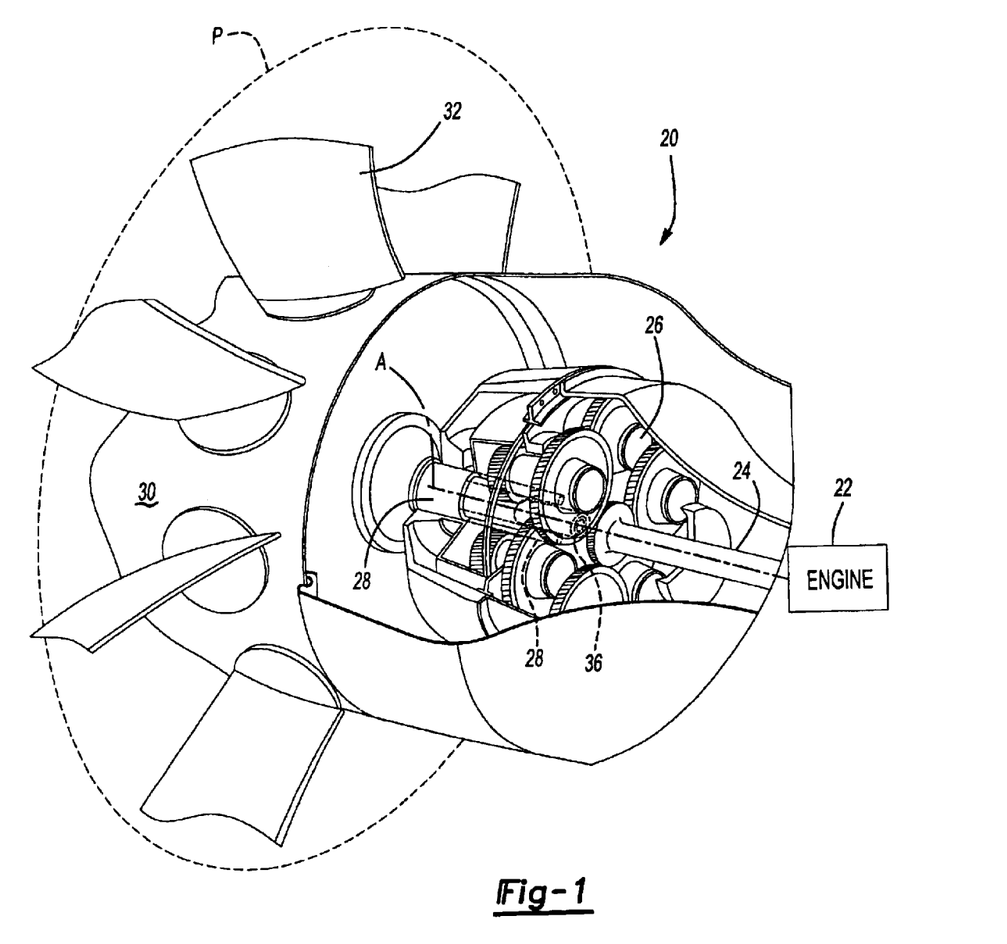
FIG. 1 is a general perspective view an exemplary gas turbine turboprop engine embodiment for use with the present invention.

FIG. 1 illustrates a general perspective view of a propeller system 20. It should be understood that although a propeller system typical of a turboprop aircraft is illustrated in the disclosed embodiment, various rigid prop/rotor systems including tilt rotor and tilt wing systems will benefit from the present invention.

A gas turbine engine (illustrated schematically at 22) which rotates a turbine output shaft 24 at a high speed powers the propeller system 20. The turbine output shaft 24 drives a gear reduction gearbox (illustrated somewhat schematically at 26) which decrease shaft rotation speed and increase output torque. The gearbox 26 drives a propeller shaft 28 which rotates a propeller hub 30 and a plurality of propeller blades 32 which extend therefrom.

It should be understood that a conventional offset gearbox will also benefit from the present invention. Axis A is substantially perpendicular to a plane P which is defined by the propeller blades 32. It should be understood that an in-line and an offset gearbox will benefit from the present invention.

Figure 2A:
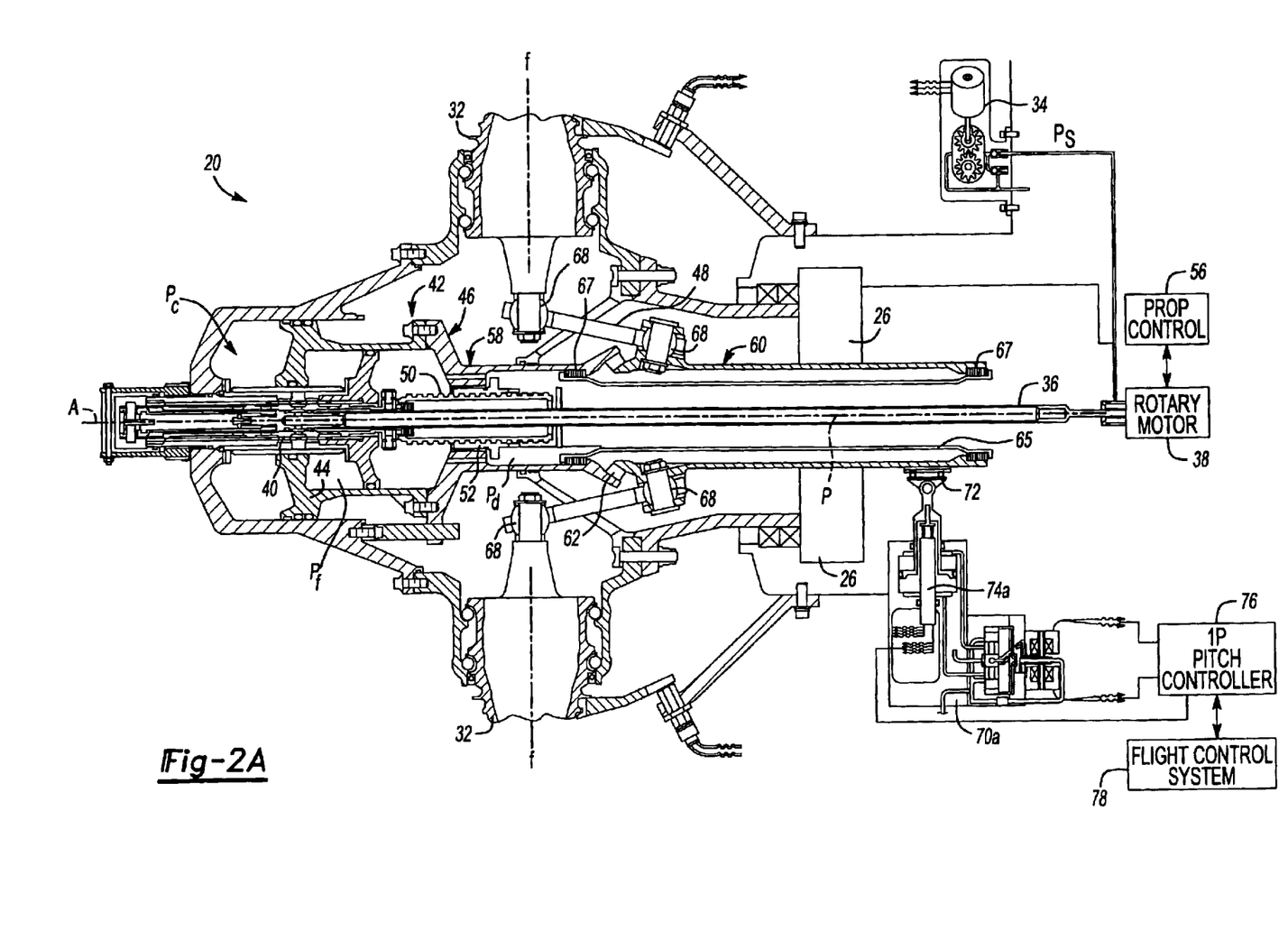
FIG. 2A is a sectional view of a propeller system illustrating the electronic/hydraulic control system.

Referring to FIG. 2A, a schematic sectional view of the propeller system 20 taken along axis A is illustrated. A main pump (illustrated schematically at 34) for actuating the various mechanism disclosed herein, provides hydraulic pressure. Main pump 34 provides a pressure indicated by the $P_{subscript}$ designations, wherein $P_s$ is supply pressure, and $P_D$ is drain pressure.

Supply pressure $P_s$ is communicated through a transfer tube 36 mounted within the rotating propeller shaft 28 along axis A. A pitch change motor (illustrated schematically at 38) is mounted to the transfer tube 36 to provide differential rotation between the transfer tube 36 and the rotating propeller shaft 28 about axis A.

The supply pressure $P_s$ is metered at a pitch change valve 40 within the rotating propeller shaft 28 to hydraulically operate a pitch change actuator assembly 42. Drainage from the pitch change valve 40 is preferably communicated through the actuator assembly 42, through the gearbox 26 (FIG. 1) and back into the drain system for access by the main pump 34.

The pitch change actuator assembly 42 includes a pitch change actuator piston 44 located between a coarse pitch actuator chamber $P_C$ and a fine pitch actuator chamber $P_F$. The chambers $P_C$, $P_F$ are respectively supplied with coarse pitch change pressure $P_C$ and fine pitch change pressure $P_F$ such that the piston 44 is driven by differential pressure therebetween. The pitch change actuator piston 44 is mounted to a pitch change yoke 46 which translates therewith.

Differential rotation of the transfer tube 36 rotates a pitch lock screw 50 within a threaded pitch nut 52. Pitch nut 52 is mounted to the pitch change actuator assembly 42 such that the pitch lock screw 50 and threaded pitch nut 52 axially slide in response to movement of the pitch change actuator piston 44 to provide feedforward/feedback control.

Axial movement of the pitch lock screw 50 translate the pitch change valve 40. Translation of the pitch change valve 40 along axis A selectively communicate the coarse pitch change pressure $P_C$ and fine pitch change pressure $P_F$ to supply pressure $P_s$ and drain pressure $P_D$. A fluid balance between the chambers $P_C$, $P_F$ is thereby disturbed which increases the fluid pressure within one chamber $P_C$, $P_F$ while decreasing the fluid pressure within the other $P_C$, $P_F$ producing a pressure differential therebetween. The differential pressure translates the piston 44 and attached pitch change yoke 46 along axis A. Translation of the pitch change yoke 46 along axis A drives a pitch link 48 attached to each propeller blade 32 to thereby collectively change the pitch thereof toward the desired blade pitch angle.

Preferably, a propeller controller (illustrated schematically at 56) selectively operates the pitch change motor 38 to affect translation of the pitch change actuator assembly 42 though the transfer tube 36, pitch lock screw 50 and the pitch change valve 40. Translation of the pitch change actuator assembly 42 along axis A accomplishes speed governing, synchrophasing, beta control, feathering, unfeathering and other collective control of the propeller blades 32 in response to the propeller controller 56 as generally known. The controller 56 is preferably programmed in a known manner to perform the functions as set forth above. It should be understood that although a particular actuation arrangement for collective control of the propeller blades 32 is disclosed herein, many prop/rotor actuation systems different from that disclosed herein will benefit from the present invention.

Figure 3A:
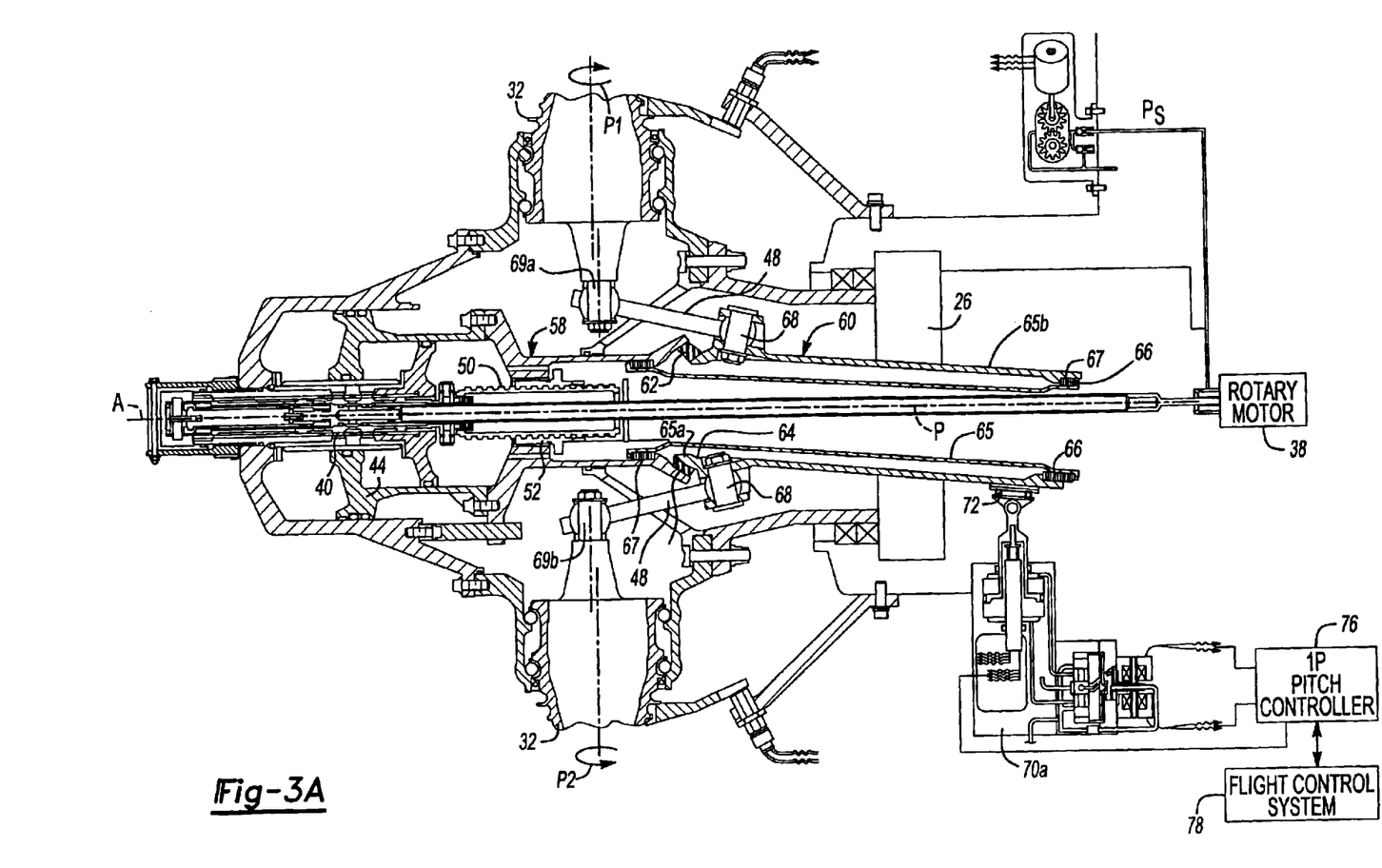
FIG. 3A is a schematic view of a propeller system with an articulatable pitch change yoke portion deflected off an axis of rotation.
Figure 3B:
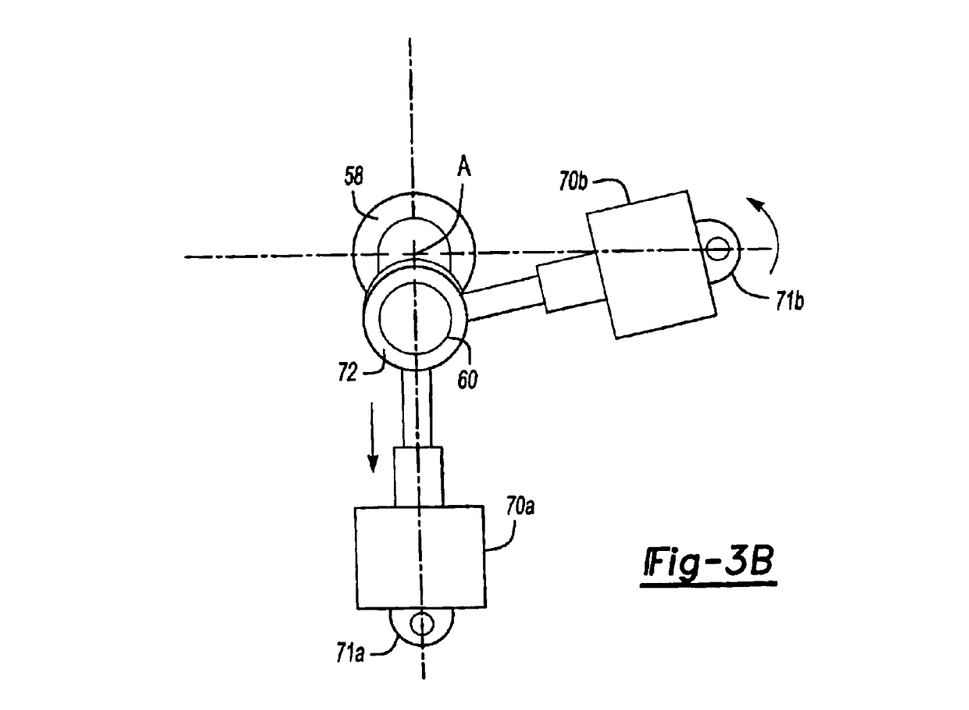
FIG. 3B is a rear view of the propeller system of FIG. 3A.

The pitch change yoke 46 preferably includes a translating pitch change yoke portion 58 and an articulatable pitch change yoke portion 60. The articulatable pitch change yoke portion 60 is mounted to the translating pitch change yoke portion 58 through elastomeric bearings 62 and 67 such that the articulatable pitch change yoke portion 60 can be deflected off a propeller axis of rotation A (FIG. 3A, 3B).

The elastomeric bearing 62 defines a rotational hinge point P for the articulatable pitch change yoke portion 60 relative the translating pitch change yoke portion 58. That is, a forward section 65a of the articulatable pitch change yoke portion 60 adjacent the elastomeric bearing 62 is on axis A while a rearward section 65b of the articulatable pitch change yoke portion 60 can be deflected off axis A (FIG. 3A, 3B). It should be understood that although an elastomeric bearing is illustrated in the disclosed embodiment other joints such as constant velocity joints will also benefit from the present invention.

The pitch link 48 attached to each propeller blade 32 is attached to the articulatable pitch change yoke portion 60. Preferably, a joint 68 such as a ball link is mounted to each end of each pitch link 48. One joint 68 of each pitch link 48 is attached to a propeller blade 32 while the other joint 68 of each pitch link is attached to the articulatable pitch change yoke portion 60. The pitch link 48 is attached to each propeller blade 32 off of a propeller feathering axis f such that linear movement of link 48 causes a pitch change of the propeller blade 32 about the feathering axis f. Preferably, each pitch link 48 is attached to the articulatable pitch change yoke portion 60 adjacent the elastomeric bearing 62.

A tubular seal 65 having a diameter smaller than the articulatable pitch change yoke portion 60 is mounted within the pitch change actuator assembly 42 through elastomeric bearings 62, 67 which allow movement of the articulatable pitch change yoke portion 60 relative the translating pitch change yoke portion 58. That is, tubular seal 65 is mounted within the articulatable pitch change yoke portion 60 and the translating pitch change yoke portion 58 to isolate the elastomeric bearing 62 and to allow drain pressure $P_D$ to communicate therethrough.

Figure 2B:
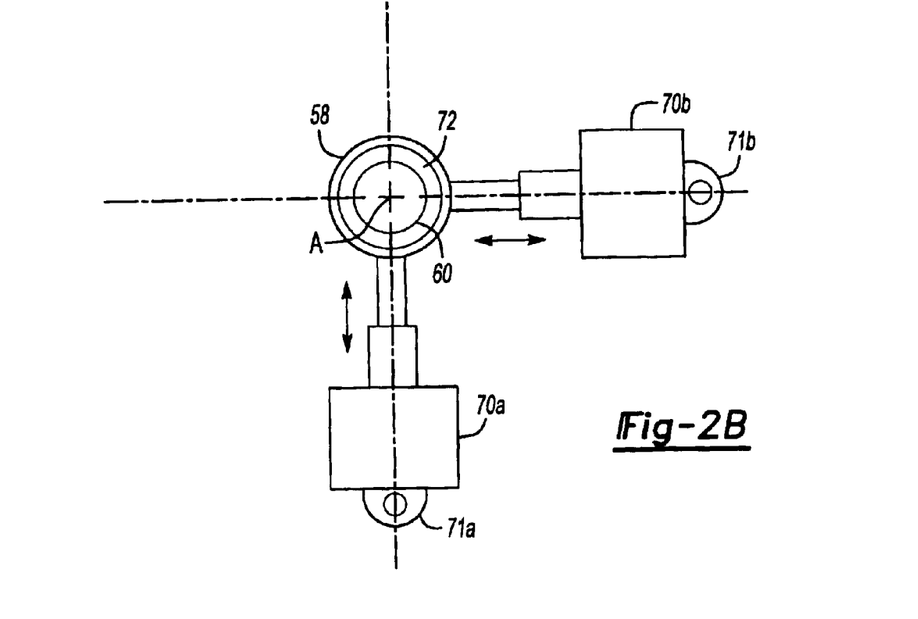
FIG. 2B is a rear view of the propeller system of FIG. 2A.

A first cyclic pitch actuator 70A and a second cyclic pitch actuator 70B are preferably mounted to the articulatable pitch change yoke portion 60 through a coupling 72 (FIG. 2B, 3B). Coupling 72 accommodates rotation and translation of the articulatable pitch change yoke portion 60. That is, the coupling 72 permits rotation of the articulatable pitch change yoke portion 60 when deflected off axis A (FIG. 3A, 3B). Various couplings will benefit from the present invention. Coupling 72 is located in a stationary field such as within or aft of the gearbox 26 to provide linear access for the fixed cyclic pitch actuator 70A, 70B. The cyclic pitch actuators 70A, 70B are each preferably mounted on a pivot 71A, 71B to accommodate deflection of the articulatable pitch change yoke portion 60 (FIG. 3B). It should be understood that other mounting arrangements for the cyclic pitch actuators 70A, 70B will also benefit from the present invention.

Figure 4:
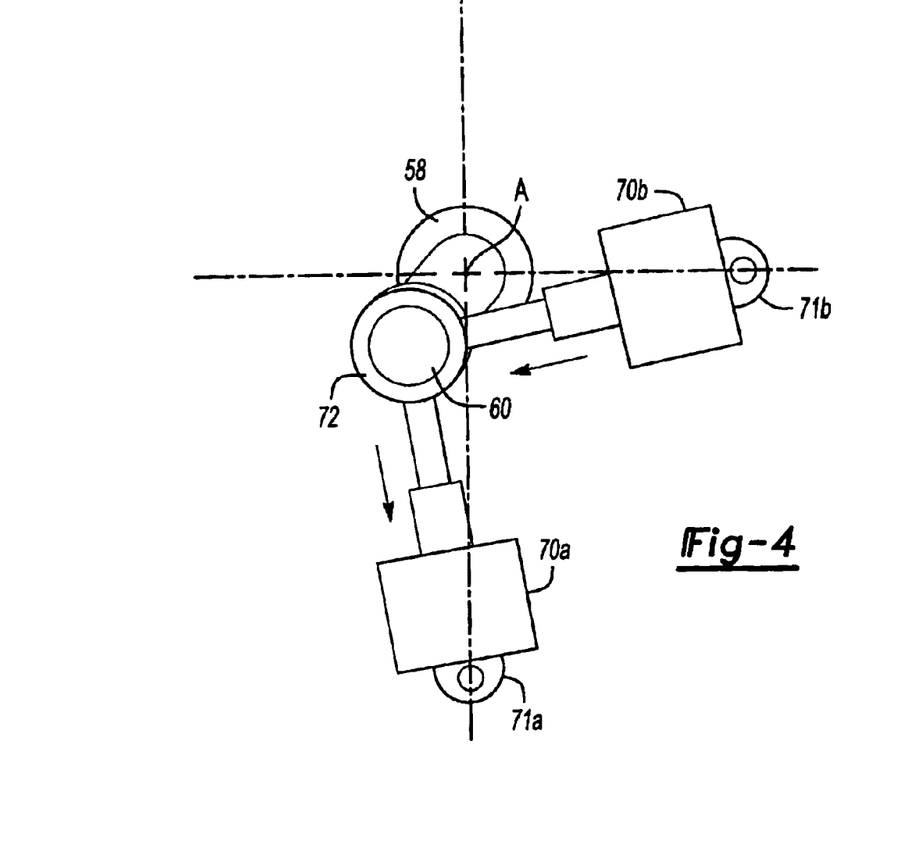
FIG. 4 is a schematic rear view illustrating the articulatable pitch change yoke portion in another position.

The cyclic pitch actuator 70A, 70B are preferably mounted to the coupling 72 in a horizontal and vertical relationship 90 degrees apart (FIG. 2B, 3B). Two cyclic pitch actuators 70A, 70B provide movement of the articulatable pitch change yoke portion 60 such that the articulatable pitch change yoke portion 60 may be deflected off axis A in any X, Y direction (FIG. 4). Each cyclic pitch actuator 70A, 70B is preferably a hydraulic actuator which operates in response to a pitch controller 76 to deflect the pitch change yoke portion 60 away from axis A. A sensor 74A and 74B such as a linear variable differential transformer (LVDT) communicates with each cyclic pitch actuator 70A, 70B and the cyclic pitch controller 76. The sensors 74A, 74B identify movement of cyclic pitch actuator 70A, 70B to provide a feedback loop with the cyclic pitch controller 76. The controller 76 thereby receives a signal of actual articulatable pitch change yoke portion 60 position through communication with the sensors.

Preferably, the cyclic pitch controller 76 communicates with an aircraft flight control system (illustrated schematically at 78) to operate the cyclic pitch function of the propeller system 20 independently of the propeller controller 56 which provides collective pitch control. Engine power management and propeller speed control are performed conventionally through collective pitch control while the cyclic pitch function according to the present invention is provided in combination with the aircraft flight control system 78. In other words, the cyclic pitch function according to the present invention may be considered a load vectoring system which operates in combination with, or in lieu of, other flight control surfaces. The cyclic pitch control function according to the present invention can be utilized to improve aircraft maneuverability and/or reduce external forces which would be otherwise applied to the airframe.

Figure 5:
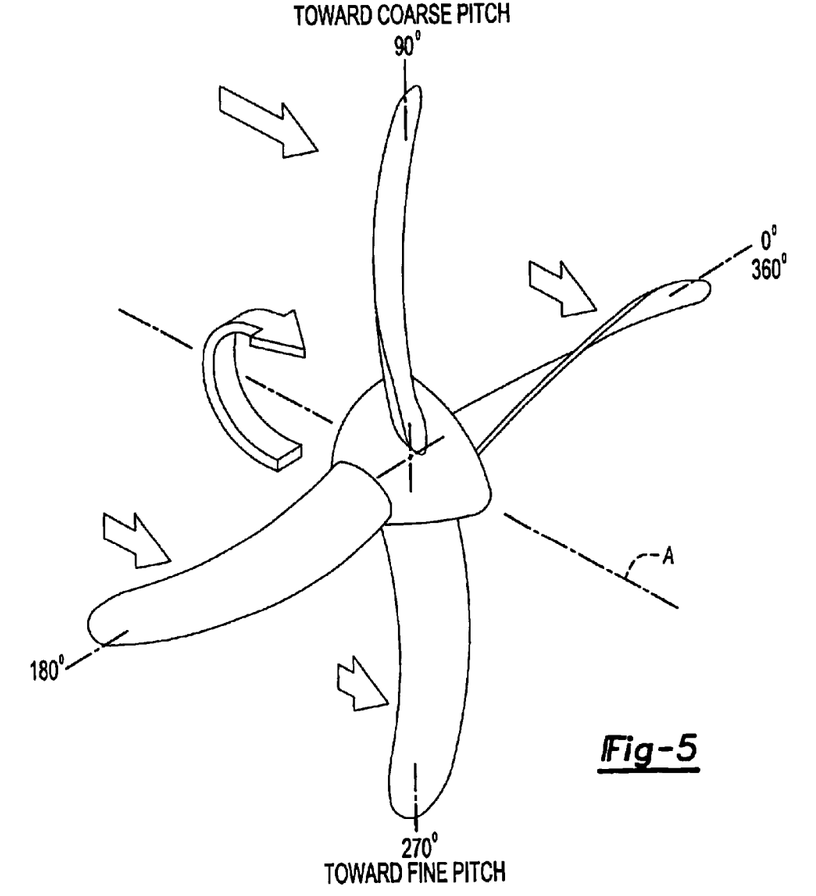
FIG. 5 is a schematic force diagram view of the propeller system generation of a nose down moment.

In operation, the propeller system 20 generates a once per revolution (1P) variation in blade load through cyclic pitch. While the axis of the thrust vector remains perpendicular to the plane of the blades, the variation in blade load creates a bending moment on the propeller shaft which appears fixed in relation to the aircraft. Such 1P variations may occur during aircraft maneuvering when inflow angles are not on the propeller axis of rotation. Conventional blade mounting arrangements accommodate these off axis forces by rigidly mounting the propeller blades to the hub to prevent flapping and rigidly mount the propeller shaft 28 to the gearbox 26 (FIG. 1). Off-axis forces are thereby transmitted directly from the propeller blades to the airframe. The present invention advantageously utilizes this conventional mounting arrangement to generate aircraft attitude control through generation of a moment about the propeller shaft 28 (FIG. 5). Combination of the cyclic pitch actuators 70A, 70B provides a moment in any angular direction while the linear deflection of the cyclic pitch actuators 70A, 70B generates the magnitude of propeller thrust.

Referring to FIG. 3A, an aircraft flight control system 78 commands the cyclic pitch controller 76 to generate a moment about the propeller axis of rotation A to assist aircraft maneuvering or reduce external forces being applied to the airframe. For example, with reference to a commanded nose down pitching moment from the flight control system 78, the cyclic pitch controller 76 commands the cyclic pitch actuator 70A (in the Y-axis) to retract. Retraction of the cyclic pitch actuator 70A pulls downward upon the coupling 72 and therefore deflects the pitch change actuator assembly 42 away from axis A (also illustrated in FIG. 3B).

Figure 6:
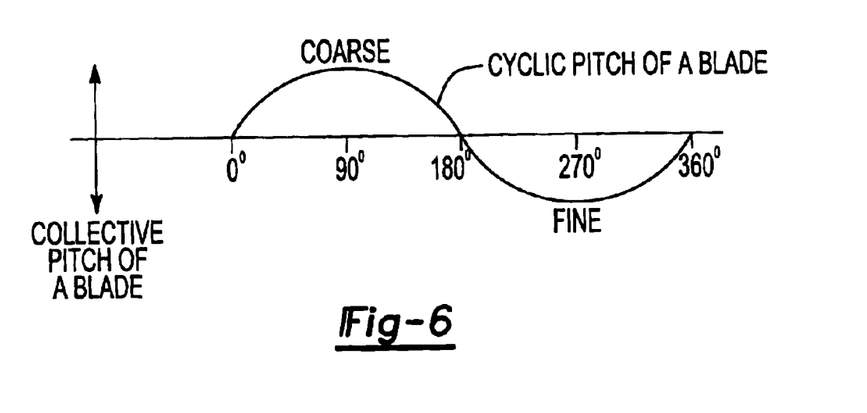
FIG. 6 is a graphical representation of cyclic and collective pitch corresponding to the schematic force diagram of FIG. 5.

The deflected pitch change actuator assembly 42 changes the pitch change effect of each pitch link 48 as a function of its angular position. Upper pin 68 effectively moves to the right (arrow P1) and lower pin 68 will have moved to the left (arrow P2). Elastomer 62, 66 and 67 will distort to accommodate the deflections. Links 48 are rigid and of the same length so therefore the upper blade pin 69a will have moved to the right in the picture and the lower blade pin 69b will have moved to the left. Since actuators 70 do not rotate with the propeller, articulatable pitch change yoke portion 60 will remain in the deflected position (as illustrated in FIG. 3A) as the propeller blades 32 rotate causing blade pins 69A, 69B to move from a forward position to an aft position and back to the forward position during one full revolution of each propeller blade 32. This is the geometry that causes the small change in blade angle known as cyclic pitch. That is, the deflection of the articulatable pitch change yoke portion 60 off axis A effectively shifts the pitch links 48 to effect a 1P change in propeller blade 32 pitch as each propeller blade 32 rotates about the deflected articulatable pitch change yoke portion 60. In other words, a sinusoidal pitch angle is superimposed on normal pitch angle (FIG. 6).

In this example, the propeller blades which pass through the 12 o'clock position (90°) are deflected toward coarse pitch while the propeller blades which pass through the 6 o'clock position (270°) are deflected toward fine pitch. The propeller blades intermediate these positions (0°, 180°) are deflected at the commanded collective pitch angle. The propeller blades which pass through the 12 o'clock position generate greater thrust while the propeller blades which pass through the 6 o'clock position generate less thrust (FIG. 5). A nose down pitching moment is thereby provided by the 1P thrust variation through cyclic pitch.

Figure 7:
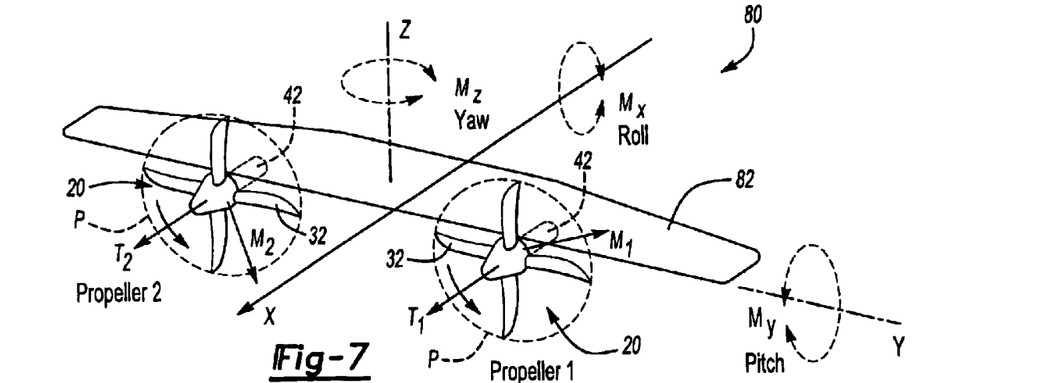
FIG. 7 is a schematic force diagram of an aircraft utilizing the propeller system according to the present invention.

Referring to FIG. 7, an aircraft (illustrated schematically at 80) with a wing 82 for providing lift and two or more propeller systems 20 according to the present invention. The propeller systems 20 produce forward thrust and incorporating a pitch change actuator assembly 42. As indicated, the propeller systems 20 provide Thrust (T1 & T2), and Moments (M1 & M2).

Moments M1 & M2 are vectorally represented using the conventional "right hand rule" notation and may be directed anywhere, independently of each other 360 degrees within the plane of rotation of the propeller blades 32.

The appropriate combination of the vectors M1 & M2 will produce desired pitch and roll moments My & Mx as desired to control the pitch and roll of the aircraft. In addition, the thrust vectors T1 and T2 may be combined to provide the appropriate moment Mz on the aircraft to control the yaw as required.

These moments and vectors are provided by the incorporation of directional cyclic pitch through the pitch change actuator assembly 42 of the present invention in combination with the normal propeller function of producing thrust for forward flight.

Figure 8:
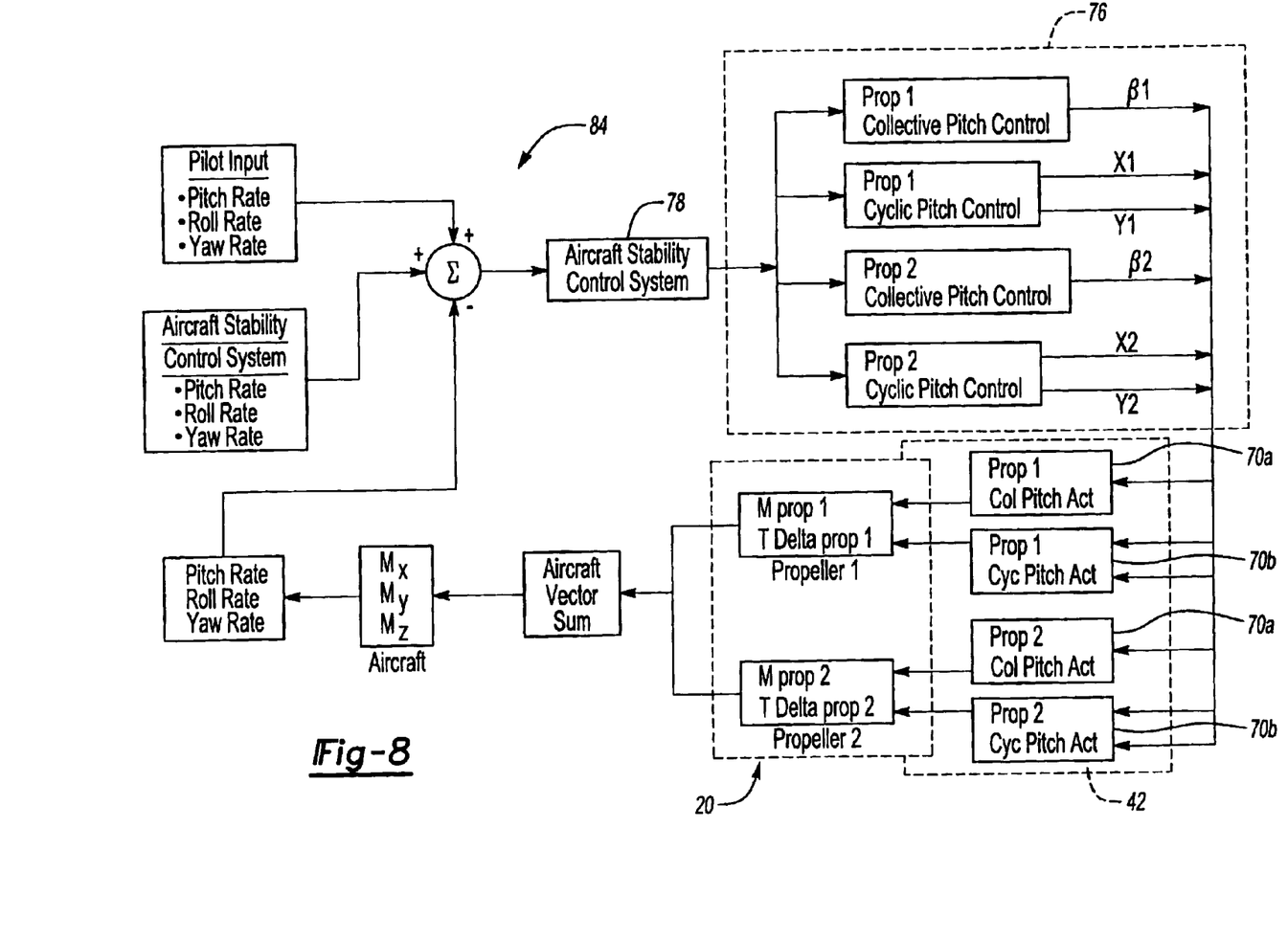
FIG. 8 is a block diagram of an aircraft control system corresponding to FIG. 7.

Referring to FIG. 8, an automatic feedback control system 84 schematically illustrated in block diagram. As generally known, the desired condition of the aircraft is compared to the actual condition of the aircraft. The difference is output to the pitch change actuator assembly 42 with a direction and magnitude suitable to cause the desired change. Inputs 86 from the pilot and/or autopilot are supplied to the control system 84 in the form pitch rate, roll rate and yaw rate as in a typical aircraft control system.

The control system 84 compares the requested attitude rates to the existing attitude rates of the aircraft and determines appropriate magnitude and vector direction changes for the control functions, M1, M2 T1 and T2. These inputs to the propeller control system may take the form of; Beta(1), Beta(2), X(1), X(2), Y(1) and Y(2). Where Beta(n) refers to the nominal collective blade pitch angle for propeller (n). X(n) and Y(n) refer to orthogonal inputs defining the desired angular position and magnitude of the cyclic moment vector M(n) in the propeller plane P (FIG. 7).

The control system 84 executes the requested commands to the appropriate actuators (70A, 70B; FIGS. 2A, 2B) thus producing a change in the nominal thrust output and moment vector of location and magnitude as requested by the control system 84. The changes in moments and thrust applied to the airframe 80 (FIG. 7) are vector summed by the aircraft and thus produce the expected changes in pitch, roll and yaw thus satisfying the control system 84.

As the present invention generates a moment rather than a force, separation between the propeller and the aircraft center of gravity is not require to affect attitude. Aircraft control is also accommodated during single engine operation. Moreover, because the propeller blades are rigidly mounted and do not flap, propeller to propeller and propeller to aircraft clearances need not increase to incorporate the present invention.

Typically, maximum bending moments on the propeller shaft due to cyclic angle of attack occurs during aircraft takeoff. The resulting bending moments are rather large and conventional propeller systems are rigidly structured therefore. The system 20 is therefore readily retrofitted to conventional turboprops as the cyclic pitch control system as described by this invention, may be used to negate undesirable effects of these bending moments caused by rotation of the aircraft during takeoff and also to minimize the size of the control surfaces.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A propeller control system comprising:
    a propeller shaft which rotates about an axis of rotation to drive a plurality of propeller blades extending therefrom;
    a translating pitch change yoke portion mounted within said propeller shaft along said axis of rotation; and
    an articulatable pitch change yoke portion pivotally mounted to said translating pitch change yoke portion for axial movement therewith, said translating pitch change yoke portion axially movable along said axis of rotation to collectively change a pitch of said plurality of propeller blades, said articulatable pitch change yoke portion deflectable off said axis of rotation to cyclically change the pitch of said plurality of propeller blades.

2. The propeller control system as recited in claim 1, further comprising an elastomeric bearing between said translating pitch change yoke portion and said articulatable pitch change yoke portion.

3. The propeller control system as recited in claim 1, further comprising a link mounted to said articulatable pitch change yoke portion and each of said plurality of propeller blades.

4. The propeller control system as recited in claim 1, further comprising a link mounted to said articulatable pitch change yoke portion and each of said plurality of propeller blades, each of said links mounted to said articulatable pitch change yoke portion adjacent an elastomeric bearing mounted between said translating pitch change yoke portion and said articulatable pitch change yoke portion.

5. The propeller control system as recited in claim 1, wherein said translating pitch change yoke portion and said articulatable pitch change yoke portion are mounted to a pitch change actuating piston located between a coarse pitch actuator chamber and a fine pitch actuator chamber.

6. The propeller control system as recited in claim 1, further comprising a coupling mounted about said articulatable pitch change yoke portion, said articulatable pitch change yoke portion rotatable and translatable within said coupling.

7. The propeller control system as recited in claim 6, further comprising a pitch change actuator mounted to said coupling to deflect said articulatable pitch change yoke portion from said axis of rotation.

8. The propeller control system as recited in claim 6, further comprising a first pitch change actuator mounted to said coupling to deflect said articulatable pitch change yoke portion from said axis of rotation in a first direction and a second pitch change actuator mounted to said coupling to deflect said articulatable pitch change yoke portion from said axis of rotation in a second direction.

9. The propeller control system as recited in claim 8, wherein said first pitch change actuator and said second pitch change actuator are pivotally mounted.

10. The propeller control system as recited in claim 8, further comprising a cyclic pitch controller in communication with said first pitch change actuator and said second pitch change actuator.

11. The propeller control system as recited in claim 10, wherein said cyclic pitch controller communicates with an aircraft flight control system.

12. The propeller control system as recited in claim 1, wherein said propeller shaft is rigidly mounted through a gear reduction gearbox.

13. A method of cyclically controlling a pitch of a plurality of rigidly mounted propeller blades comprising the steps of:
    (1) translating a first pitch change yoke portion and a second pitch change yoke portion mounted within a propeller shaft along an axis of rotation to collectively change a pitch of said plurality of propeller blades; and
    (2) articulating the second pitch change yoke portion off said axis of rotation relative the first pitch change yoke portion to cyclically change the pitch of said plurality of propeller blades.

14. A method as recited in claim 13, further comprising the step of:
    rotating the first and second pitch change yoke portion with the propeller shaft.

15. A method as recited in claim 13, further comprising the step of:
    linearly actuating a pitch change actuator to deflect said second pitch change yoke portion from said axis of rotation.

16. A method as recited in claim 15, further comprising the step of:
   pivotally mounting the pitch change actuator perpendicular to the second pitch change yoke portion.

17. A method as recited in claim 13, further comprising the step of:
   mounting a first pitch change actuator and a second pitch change actuator perpendicular to the second pitch change yoke portion, the first pitch change actuator radially separated from the second pitch change actuator by 90 degrees.

18. A method as recited in claim 17, further comprising the step of:
   mounting the first pitch change actuator and the second pitch change actuator adjacent a gear reduction gearbox.

19. A method as recited in claim 13, further comprising the step of:
   controlling said step (2) in response to an aircraft flight control system.

20. A flight control method for an aircraft comprising a propeller system having a plurality of rigidly mounted propeller blades, said method comprising the steps of:
   (1) mounting the propeller system to an aircraft wing such that the plurality of rigidly mounted propeller blades of the propeller system rotate generally within a plane defined generally transverse of an aircraft wing;
   (2) collectively changing a pitch of the plurality of rigidly mounted propeller blades of the propeller system to generate a trust; and
   (3) cyclically changing the pitch of the plurality of propeller blades to generate a moment.

21. A method as recited in claim 20, further comprising the step of:
   controlling the moment of said step (3) from at least two propeller systems to control aircraft movement about an axis.

22. A method as recited in claim 20, further comprising the step of:
   controlling the moment of said step (3) from at least two propeller systems mounted to the aircraft wing to generate a bending moment about an aircraft axis.

23. A method as recited in claim 20, further comprising the step of:
   controlling the combination of the thrust of said step (2) with the moment of said step (3) to generate a bending moment about an aircraft axis.

24. A method as recited in claim 20, further comprising the step of:
   controlling the combination of the thrust of said step (2) with the moment of said step (3) for at least two of the propeller systems to generate a bending moment about an aircraft axis.

25. A method as recited in claim 20, wherein the trust of said step (2) is directed generally parallel to a chord of the aircraft wing.

26. A method as recited in claim 20, wherein the trust of said step (2) is an aircraft forward thrust.

27. A method as recited in claim 20, wherein the trust of said step (2) is directed generally parallel to an aircraft X-axis.

* * * * *